United States Patent [19]

Hara et al.

[11] 4,286,171
[45] Aug. 25, 1981

[54] OPTOELECTRIC CROSS-POINT SWITCH

[75] Inventors: Elmer H. Hara; R. Ian MacDonald, both of Ottawa, Canada

[73] Assignee: Canadian Patents & Dev. Ltd., Ottawa, Canada

[21] Appl. No.: 17,722

[22] Filed: Mar. 5, 1979

[51] Int. Cl.³ .......................................... G02B 27/00
[52] U.S. Cl. ................................................ 250/551
[58] Field of Search ...................... 250/551, 221, 229; 350/96.13, 96.15; 455/601, 602, 606, 608, 612, 617, 619

[56] References Cited

U.S. PATENT DOCUMENTS

| | | | |
|---|---|---|---|
| 3,462,605 | 8/1969 | Engeler | 250/551 |
| 3,952,265 | 4/1976 | Hunsperger | 350/96.15 |
| 4,056,719 | 11/1977 | Waaben | 250/551 |
| 4,068,252 | 1/1978 | Lebailly | 357/19 |
| 4,152,713 | 5/1979 | Copeland et al. | 357/19 |

Primary Examiner—David C. Nelms
Attorney, Agent, or Firm—Edward Rymek

[57] ABSTRACT

The optoelectronic cross-point switch suitable for a broadband switching array includes a photodiode which converts an optical signal impinging upon it to an electronic signal and a biasing circuit for selectively reverse biasing the photodiode to render the photodiode responsive to the optical signal or forward biasing the photodiode to render the photodiode substantially non-responsive to an optical signal. The biasing circuit consists of positive and negative voltage sources and a controllable switch to connect the sources to the photodiode. A load circuit which is connected to the photodiode for developing the output signal may consist of a single resistor, a pair of series resistors, an operational amplifier with feedback or an rf transformer. The load circuit can also include an rf switching diode connected to the photodiode to improve isolation and to reduce the electrical power required to forward bias the photodiode.

8 Claims, 7 Drawing Figures

OPTOELECTRIC CROSS-POINT SWITCH

BACKGROUND OF THE INVENTION

This invention is directed to optoelectronic broadband switching arrays and in particular to a novel optoelectronic cross-point switch for use in such an array.

Linearity and power limitations of solid state electrooptic devices restrict to about three the number of frequency-division multiplexed analogue video channels that can be carried over reasonable distances via an optical-fiber link. Centrally switched distribution is thus the best method for providing a broadband communications service to subscribers on optical fibers. Since some subscribers may want simultaneous access to more than one channel, the central switching apparatus must be capable of selecting two or three channels and multiplexing them in a format compatible with the limited frequency-division multiplexing capability of the optical-fiber link to the subscriber. Either the switch must be capable of handling signals previously modulated onto their frequency-division multiplexing carriers, or each subscriber's connection at the central switching apparatus must be supplied with a set of modulators so that the switching can be done at baseband and then upconverted by the modulator to a frequency in the multiplexing scheme. The former approach uses far fewer modulators, and therefore considerable saving can be realised by a broadband switching array that is capable of switching VHF and higher frequencies. One optoelectronic cross-point switching array is described in U.S. Pat. No. 4,074,142 which issued to Albert S. Jackson on Feb. 14, 1978. This type of switching array though desireable may suffer from poor isolation between input and output channels at the cross-point switches particularly for high frequencies because it employs electronic switches separate from the photodetecting element, and thus must switch electrical signals.

SUMMARY OF THE INVENTION

It is therefore an object of this invention to provide optoelectronic cross-point switches for switching arrays.

It is a further object of this invention to provide optoelectronic cross-point switches having good isolation.

These and other objects are achieved in an optoelectronic switch having a photosensing diode which converts optical signals to electronic signals and a bias circuit which selectively renders the photodiode responsive to an optical signal by reverse biasing the diode or renders the photodiode substantially nonresponsive to an optical signal by forward biasing the diode. The biasing circuit consists of a controllable switch which connects the diode to a negative and positive voltage source. The optoelectronic switch further includes an output signal. The load circuit may include a load resistor, a pair of series connected resistors, an operational amplifier having a feedback resistor or an rf transformer. The load circuit may further include an rf switching diode connected to the photodiode to improve isolation and to reduce the electrical power required to forward bias the photodiode.

DESCRIPTION OF THE PREFERRED EMBODIMENTS

Figure 1:
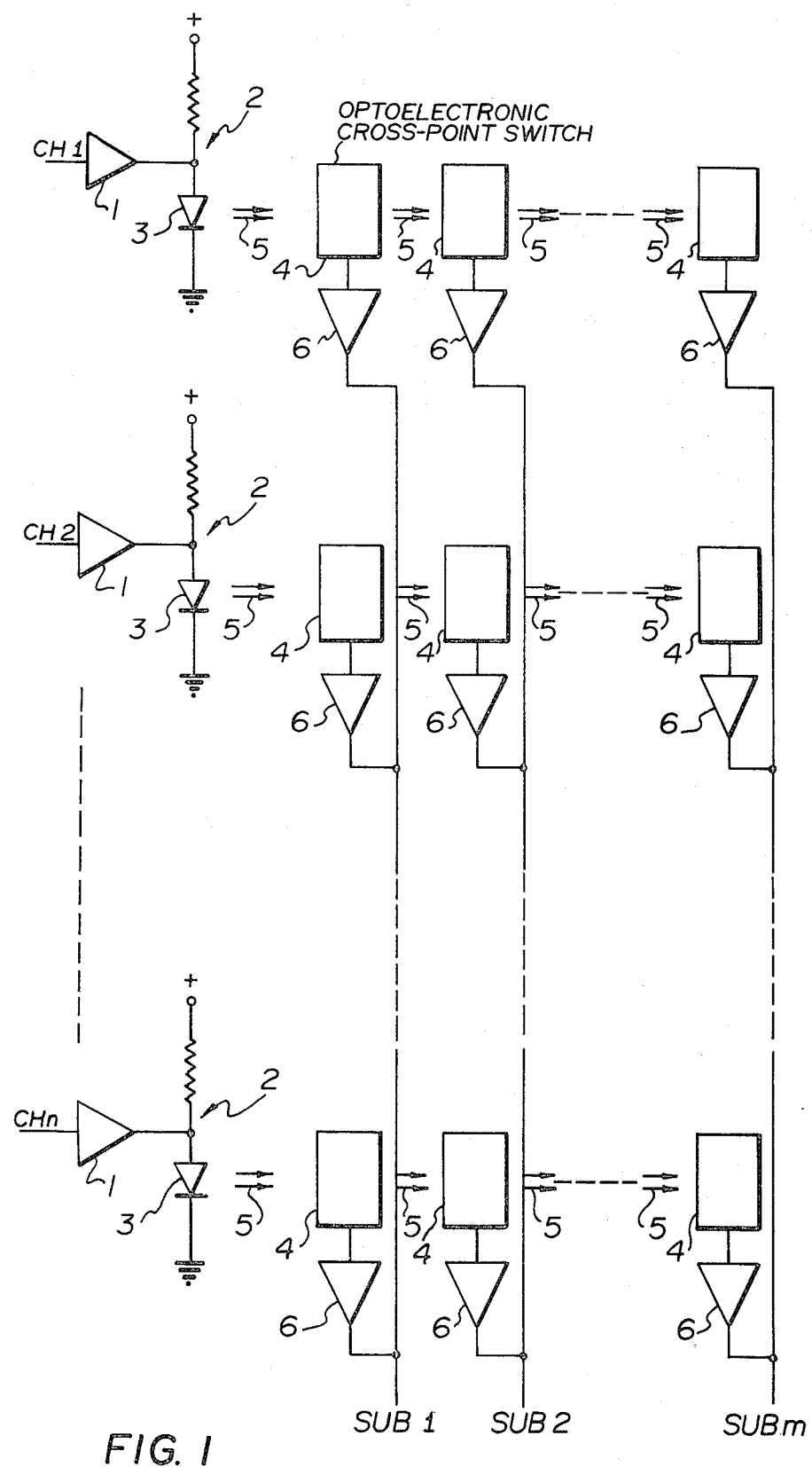
FIG. 1 illustrates a switching matrix having n input channels and m subscriber lines.

An optoelectronic switching matrix will generally take the form illustrated in FIG. 1. The different input signals to be distributed to the subscriber channels are coupled to the input channels CH 1, CH 2, ... CH n. Each signal may be a wideband video signal or other information or digital data to be distributed to one or more of the subscriber lines Sub 1, Sub 2, ... Sub m. In order to prevent crosstalk between the input and output channels that occurs by leakage through the crosspoints, optoelectronic cross-point switching is utilized because the optoelectronic cross-point switch has high isolation for rf signals.

Each input channel CH 1, CH 2, ... CH n includes an input amplifier 1 which feeds the input signal to an optical signal source 2 such as solid state light emitting device or other modulatable light source. The cheapest and smallest device for the purpose would be a properly biased light-emitting diode (LED) 3.

The modulated light from the diode 3 is distributed to a cross-point switch 4 in each of the subscriber lines Sub 1, Sub 2, ... Sub m. This distribution, represented by arrows 5, may be accomplished either by employing freely propagating light such as by an arrangement of lenses and/or mirrors, or by employing bound light waves in optical fibers or waveguides.

Figure 2:
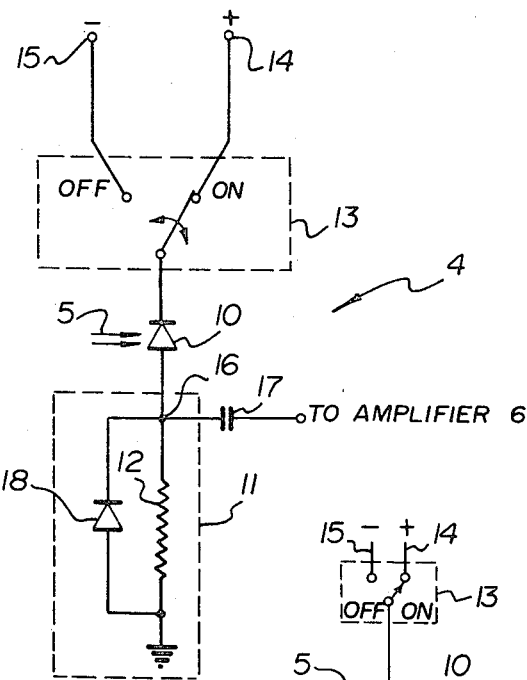
FIG. 2 illustrates the optoelectronic cross-point switch in accordance with the present invention.

Each of the switches 4 is coupled to its respective subscriber line Sub 1, Sub 2, ... Sub m by an amplifier 6. In operation, one or more of the subscriber lines Sub 1, Sub 2, ... Sub m are provided with a signal from one or more of the input channels CH 1, CH 2, ... CH n. In order to achieve this switched distribution effectively, the cross-point switches 4 must be capable of two important functions. First, when switched on, switch 4 must respond efficiently to the modulated optical signal to convert it to an electronic signal which is applied to the subscriber line. Second, when switched off, switch 4 must apply very little or no signal to the subscriber line, providing good isolation from the undesired channel. Such an optoelectronic cross-point switch 4 is illustrated in FIG. 2. Switch 4 includes a photodiode 10 such as an HP 5082-4207 p.i.n. photodiode or a TXL59 avalanche photodiode, with its anode connected to a load circuit 11 having a resistor 12 coupled to ground. The load circuit 11 may be replaced by other load circuits illustrated in FIGS. 3, 4 or 5. The cathode is connected to a switch 13 which in turn is connected to switch between positive and negative voltage sources 14 and 15 to respectively forward bias and reverse bias the diode 10. The diode connections and the polarities selected for "off" and "on" states are illustrative only and may be reversed. The switch 13, though illustrated as a mechanical switch, would preferably be a semiconductor electronic switch such as the one to be described with respect to FIG. 6. Under reverse bias the voltage across the load resistor 11 depends on the illumination, whereas under forward bias the photodiode 10 exhibits reduced quantum efficiency and also acts as a low impedance element that short-circuits out the load resistor 11 through the bias power supply which is essentially a short circuit for the signal. Since the impedance of the photodiode falls with increasing frequency and forward current, and the quantum efficiency falls with increasing forward current, the effectiveness with which the signal can be turned off improves with increasing forward bias current and with increasing frequency.

The output from the cross-point switch is taken for example from a point 16 between the diode 10 and the load resistor 12 through a coupling capacitor 17 and applied to output amplifier 6 (FIG. 1). The optional insertion of an rf switching diode 18 in the load circuit 11 in parallel with the load resistor 12 improves isolation of the cross-point switch 4 since in the forward bias state it tends to short out the resistor 12 and pull the input of the amplifier 6 to ground. At the same time, the switching diode 18 serves to reduce the electrical power required to forward bias photodiode 10 by short circuiting the load resistor 12.

Figure 3:
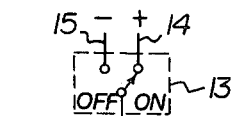
FIGS. 3, 4 and 5 illustrate the optoelectronic cross-point switch with alternate load circuits.
Figure 4:
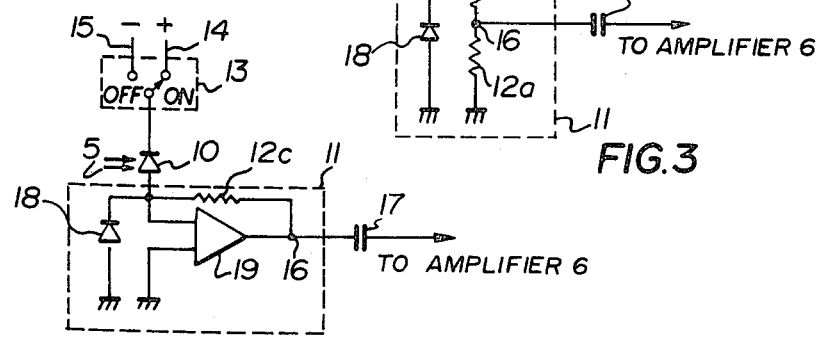
Figure 5:
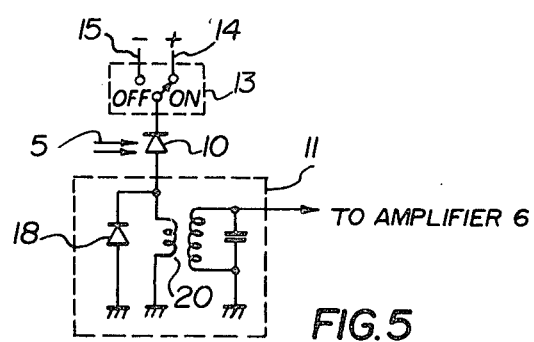
Figure 6:
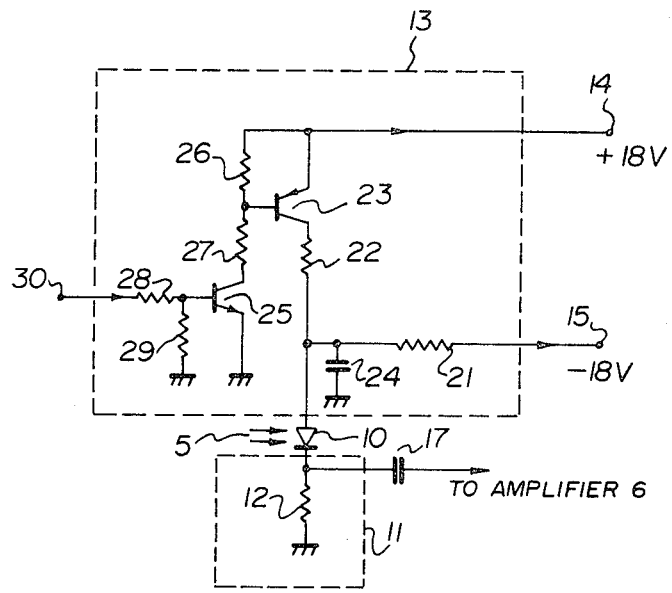
FIG. 6 illustrates the optoelectronic cross-point switch having a semiconductor bias switching circuit.

Alternate load circuits 11 from which an output signal from the optoelectronic cross-point switch may be obtained, are shown in FIGS. 4 to 6. The short circuiting function of the photodiode 10 can be enhanced by using two load resistors 12a and 12b and having the output point 16 between them as shown in FIG. 3. Resistor 12a is chosen so as to present an appropriate impedance to amplifier 6. Resistor 12b is chosen sufficiently large so as to effectively divide the leakage signal voltage appearing across the load circuit 11 in order to reduce the magnitude of the signal leakage from the forward biased photodiode 10. The maximum value for the sum of the resistances of resistors 12a and 12b is limited by the high frequency response demanded of the cross-point switch. In the reverse bias condition, photodiode 10 acts as a constant current source for the rf signal and therefore the signal sensitivity of the cross-point switch in the on-state is not significantly reduced in comparison to the circuit information shown in FIG. 2. As described with respect to FIG. 2, the optional insertion of an rf switching diode 18 in parallel with resistors 12a and 12b improves isolation and reduces power requirements.

In practice, the signal sensitivity of a photodiode has been found to be improved when the load resistor 12 is made large. In order to allow the use of a large value for the load resistor 12 while still retaining a sufficiently high frequency response, the load circuit 11 shown in FIG. 4 may be used. In the circuit 11, the inputs to an operational amplifier 19 may be connected to the diode 10 and ground respectively, with a load resistor 12c connected between the amplifier 19 output and input as a negative feedback patch. As in the previous load circuits, switching diode 18 can be used to improve the degree of isolation and reduce the forward biasing power.

The circuit 11 for obtaining the output from the optoelectronic switch 4 is not limited only to the use of a resistor 12. FIG. 5 shows an example where an rf transformer 20 with suitable bandpass characteristics which may be tuned to the appropriate frequency, is used as a means to provide the output. The switching diode 18 can again be used to improve the isolation of the optoelectronic cross-point switch.

One embodiment of an electronic switch 13 for applying the negative bias voltage 15 or the positive bias voltage to the photodiode 10 is shown in FIG. 6. Switch 13 includes a resistor 21 connected between the anode of photodiode 10 and negative source 15 for reverse biasing the photodiode thereby placing switch 4 into the on-state. Switch 13 further includes a resistor 22 and a transistor 23 connected in series between the anode of photodiode 10 and a positive source 14. The resistance of resistor 22 is much smaller than that of resistor 21 and may be zero. With transistor 23 conducting, and since the resistance of resistor 22 is low relative to the resistance of resistor 21, photodiode 10 is forward biased. An electric current thus flows from the positive bias supply 14 through transistor 23, resistor 22, photodiode 10 and load resistor 12. The photodiode 10 therefore is rendered insensitive to the incident optical signal 5. In this state, a capacitor 24, connected between the photodiode 10 anode and ground, allows the load resistor 11 to be short circuited to ground. The value of the capacitor 24 is chosen sufficiently large so as to present a very low impedance to the rf signal.

In order to control transistor 23 a further transistor 25 with appropriate biasing resistors 26, 27, 28 and 29 is connected to the base of transistor 23 such that with the input 30 to transistor 25 at ground potential, transistor 25 and thus resistor 23 remain in a non-conducting state. However, with a positive potential of approximately 3 volts applied to input 30, transistor 25 and thus transistor 23 are switched to a conducting state. The potentials applied to the input 30 may be obtained from semiconductor circuits based on TTL units.

Figure 7:
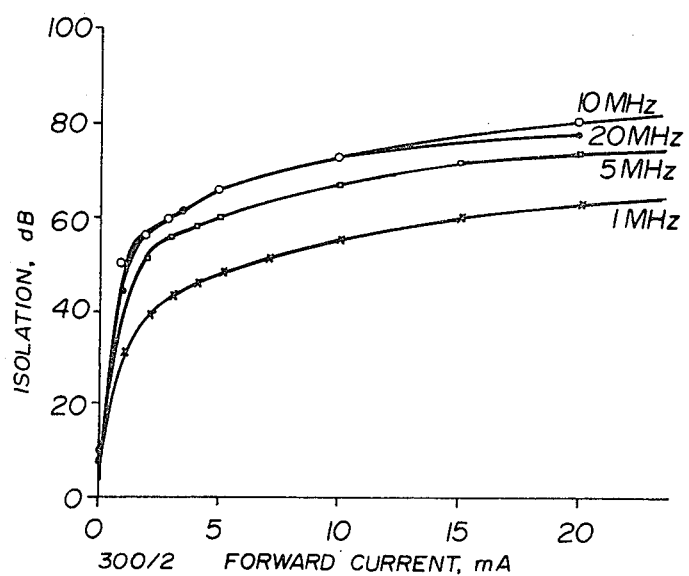
FIG. 7 illustrates isolation as a function of photodiode forward current for the cross-point switch.

The isolation of the switch 4 is defined as the ratio of the measured response in reverse bias to the response in forward bias. For an HP 5082-4207 p.i.n. photodiode 10, with a load resistor 12 of 50Ω, the isolation as a function of forward bias current for modulation frequencies of 1, 5, 10 and 20 MHz was measured. The results are shown on FIG. 7. The reverse bias voltage in the on-state was 26 V, the received average optical power was 305 μW and the optical power modulation factor was 0.9. The isolation for all frequencies rises with the forward bias current, reaching a saturation level above about 10 mA. The isolation also rises with frequency up to 10 MHz.

Further measurements employing a split load resistor as shown in FIG. 3 show that below 300 kHz the switch 4 isolation is approximately 65 dB and is largely independent of received power and of frequency over the range 30-300 kHz, although the isolation does tend to rise near 300 kHz. Measurements above 300 kHz using a single 50Ω load show that isolation is dependent both on frequency and on received power. At 305 μW received power the isolation rises with increasing frequency to a value above 80 dB at 100 MHz. At the lower optical powers the isolation peaks at about 50 MHz. The drop-off in isolation above 50 MHz appears to be due to drop-off in the amplitude response of the reverse biased photodiode in combination with the load at higher frequencies.

As indicated previously, the addition of an rf switching diode 18 across the load circuit load 11 improves the isolation of the switch 4, particularly at low frequencies. For example, better than 80 dB isolation was observed between 30 Hz and 300 kHz for 305 μW incident power when the rf switching diode was employed as illustrated in FIG. 3. The increase in isolation at high frequencies is not as marked, since the photodiode 10 forward bias impedance is already sufficiently low.

We claim:

1. An optoelectronic switch comprising:

a photosensing diode for converting an optic signal to an electronic signal; and bias means connected to the photosensing diode for selectively reverse biasing the photosensing diode to render the photosensing diode responsive to an optical signal or forward biasing the photosensing diode for rendering the photosensing diode substantially nonresponsive to an optical signal.

2. An optoelectronic switch as claimed in claim 1 which further includes a load circuit connected to the photosensing diode, the output signal being taken from the load circuit.

3. An optoelectronic switch as claimed in claim 2 wherein the load circuit includes a load resistor connected to the photosensing diode, the output signal being taken from a junction between the photosensing diode and the resistor.

4. An optoelectronic switch as claimed in claim 2 wherein the load circuit includes a first and a second resistor connected in series with the photosensing diode, the output signal being taken from a junction between the first and second transistors.

5. An optoelectronic switch as claimed in claim 2 wherein the load circuit includes an operational amplifier having a first input connected to the photosensing diode and a second input connected to ground, and a resistor connected between the amplifier output and the first input.

6. An optoelectronic switch as claimed in claim 2 wherein the load circuit includes an rf transformer connected to the photosensing diode.

7. An optoelectronic switch as claimed in claims 3, 4, 5 or 6 wherein the load circuit further includes an rf switching diode connected to the photosensing diode.

8. An optoelectronic switch as claimed in claims 1 or 2 in which the biasing means includes controllable switch means and a positive and negative voltage source, said controllable switch means being connected to the voltage source and the photosensing diode to apply either a positive voltage or a negative voltage to the photosensing diode.

* * * * *